(12) United States Patent
Storm (10) Patent No.: US 9,261,290 B2
(45) Date of Patent: Feb. 16, 2016

(54) METHODS AND SYSTEMS FOR CONTROLLING AN ENERGY RECOVERY VENTILATOR (ERV)

(75) Inventor: Timothy Wayne Storm, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 254 days.

(21) Appl. No.: 13/074,946

(22) Filed: Mar. 29, 2011

(65) Prior Publication Data

US 2012/0253526 A1     Oct. 4, 2012

(51) Int. Cl.
*F24F 12/00* (2006.01)
*F24F 11/00* (2006.01)

(52) U.S. Cl.
CPC ........... *F24F 12/006* (2013.01); *F24F 11/0079* (2013.01); *Y02B 30/563* (2013.01); *Y02B 30/746* (2013.01)

(58) Field of Classification Search
CPC ........... G05D 23/1917; G05D 23/1934; F24F 11/0012; F24F 11/0009; F24F 11/006; F24F 11/0086; F24F 2011/0067; F24F 12/006; F24F 11/0079; G05B 15/02; Y02B 30/563; Y02B 30/746
USPC ........... 700/278, 277; 454/329; 159/4.1, 24.2
See application file for complete search history.

(56) References Cited

U.S. PATENT DOCUMENTS

| | | | |
|---|---|---|---|
| 7,181,317 B2 | 2/2007 | Amundson et al. | |
| 8,374,725 B1 * | 2/2013 | Ols | 700/277 |
| 8,457,933 B2 * | 6/2013 | Yoo et al. | 703/2 |
| 2005/0178124 A1 * | 8/2005 | Kirby | F01K 21/00 60/653 |
| 2007/0045441 A1 | 3/2007 | Ashworth et al. | |
| 2008/0230206 A1 * | 9/2008 | Lestage et al. | 165/48.1 |
| 2008/0238607 A1 * | 10/2008 | Schuricht et al. | 340/3.1 |
| 2009/0204262 A1 * | 8/2009 | Nishimura | 700/276 |
| 2009/0271154 A1 * | 10/2009 | Coad et al. | 703/1 |
| 2010/0070089 A1 * | 3/2010 | Harrod et al. | 700/277 |
| 2010/0070907 A1 * | 3/2010 | Harrod et al. | 715/772 |
| 2010/0076605 A1 * | 3/2010 | Harrod et al. | 700/276 |
| 2010/0256958 A1 * | 10/2010 | Yoo et al. | 703/2 |
| 2010/0320277 A1 | 12/2010 | Stark | |
| 2011/0146941 A1 * | 6/2011 | Benoit et al. | 165/11.1 |

(Continued)

FOREIGN PATENT DOCUMENTS

| | | |
|---|---|---|
| CN | 101893293 A | 11/2010 |
| FR | 2939872 A1 | 6/2010 |
| FR | 2942300 A1 | 8/2010 |

(Continued)

OTHER PUBLICATIONS

TenWolde, "Ventilation, humidity, and condensation in manufactured houses during winter", 1994, ASHRAE Transactions, vol. 100, pp. 1-14.*

(Continued)

*Primary Examiner* — Carlos Ortiz Rodriguez
*Assistant Examiner* — Jason Lin
(74) *Attorney, Agent, or Firm* — Conley Rose, P.C.; J. Robert Brown, Jr.; Michael J. Schofield (57) ABSTRACT

In at least some embodiments, a system includes a heat pump and an energy recovery ventilator (ERV). The system also includes a controller coupled to the heat pump and the ERV. The controller implements an ERV operation algorithm that automates operations of the ERV.

11 Claims, 7 Drawing Sheets

(56) References Cited

U.S. PATENT DOCUMENTS

2011/0151766 A1* 6/2011 Sherman et al. ............ 454/239
2012/0052791 A1* 3/2012 Kurelowech ................. 454/329

FOREIGN PATENT DOCUMENTS

| WO | 9715793 | A1 | 5/1997 |
| WO | 2007095985 | A1 | 8/2007 |
| WO | 2008146843 | A1 | 12/2008 |
| WO | 2011004025 | A1 | 7/2010 |
| WO | 2011004025 | A1 | 1/2011 |

OTHER PUBLICATIONS

PCT International Search Report; PCT Application No. PCT/US2012/026116; Aug. 23, 2012; 4 pgs.
PCT Written Opinion of the International Searching Authority; PCT Application No. PCT/US2012/026116; Aug. 23, 2012; 6 pgs.
Chinese Office Action; Application No. 201280016780.8; Jul. 2, 2015; 30 pages.
Canadian Office Action; Application No. 2,829,277; Nov. 6, 2014; 3 pages.

* cited by examiner

ERV Integration - Guided Wizard

Select the Indoor/Outdoor Conditions

412

| | Indoor Design Conditions | | | | Outdoor Design Conditions | | | |
|---|---|---|---|---|---|---|---|---|
| | Dry Bulb | Wet Bulb | Relative Humidity | Air Enthalpy | Dry Bulb | Wet Bulb | Relative Humidity | Air Enthalpy |
| Cooling | 75 | | 50 | 28.107 | 95 | | 80 | 54.706 |
| Heating | 70 | | 30 | 21.875 | 0 | | 30 | 0.249 |

Enter either WB or RH but not both.

? Help | Home | | ⇐ Back | Next ⇒

ERV Integration - Guided Wizard

413 Select Home Size

414

| Home Information: | | | | | |
|---|---|---|---|---|---|
| Sq Feet | 3 | Number of Bedrooms | | Outdoor Air Minimum: | CFM |
| Code or Design CFM for Home: | | | (a)per ASHRAE 62.2 | | |

? Help | Home | | ⇐ Back | Next ⇒

METHODS AND SYSTEMS FOR CONTROLLING AN ENERGY RECOVERY VENTILATOR (ERV)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a heat pump and refrigeration cycle, refrigerant alternately absorbs and rejects thermal energy as it circulates through the system and is compressed, condensed, expanded, and evaporated. In particular, a liquid refrigerant flows from a condenser, through an expansion device (e.g., expansion valve) and into an evaporator. As the refrigerant flows through the expansion device and evaporator, the pressure of the refrigerant decreases, the refrigerant phase changes into a gas, and the refrigerant absorbs thermal energy. From the evaporator, the gaseous refrigerant proceeds to a compressor, and then back to the condenser. As the refrigerant flows through the compressor and condenser, the pressure of the refrigerant is increased, the refrigerant phase changes back into a liquid, and the refrigerant gives up thermal energy. The process is implemented to emit thermal energy into a space (e.g., to heat a house) or to remove thermal energy from a space (e.g., to air condition a house).

A heat recovery ventilator (HRV) can help make mechanical ventilation more cost effective by reclaiming energy from exhaust airflows. HRVs use heat exchangers to heat or cool incoming fresh air, recapturing up to 80 percent of the conditioned temperatures that would otherwise be lost. Models that exchange moisture between the two air streams are referred to as Energy Recovery Ventilators (ERVs). ERVs are especially recommended in climates where cooling loads place strong demands on heating, ventilation, and air conditioning (HVAC) systems. In operation, ERVs transfer moisture from the humid air stream (incoming outdoor air in the summer) to the exhaust air stream. Efficient use of ERVs is not a trivial task and differs according to the installation environment.

SUMMARY OF THE DISCLOSURE

In at least some embodiments, a system includes a heat pump and an energy recovery ventilator (ERV). The system also includes a controller coupled to the heat pump and the ERV. The controller implements an ERV operation algorithm that automates operations of the ERV.

In at least some embodiments, a control system for an ERV includes a user interface and ERV operation logic coupled to the user interface. The ERV operation logic is configured to automate operations of an ERV based on user inputs via the user interface.

In at least some embodiments, a method for controlling an ERV includes receiving, by a controller, a user input. The ERV also includes determining, by the controller, a cubic feet per minute (CFM) ventilation value based on the user input. The method also includes automating, by the controller, operations of the ERV based on the determined CFM ventilation value.

DETAILED DESCRIPTION

The disclosed embodiments describe systems and methods to facilitate integration of an energy recovery ventilator (ERV) with a heating, ventilation, and air conditioning (HVAC) system. In at least some embodiments, an ERV operation algorithm is implemented to control when an ERV operates (turns on/off). The ERV operation algorithm accounts for the environment (e.g., indoor space) associated with the ERV to ensure efficient operation of the ERV. For example, the ERV operation algorithm may determine an appropriate cubic feet per minute (CFM) ventilation value for the environment of the ERV and automates operating the ERV based on the determined CFM ventilation value. The determined CFM ventilation value may be based on default values regarding the ERV environment and/or information provided by a user via a user interface. In at least some embodiments, the control system for ERV operations enables a user to override/ignore the ERV operation algorithm and thereby customize when the ERV operates.

Figure 1:
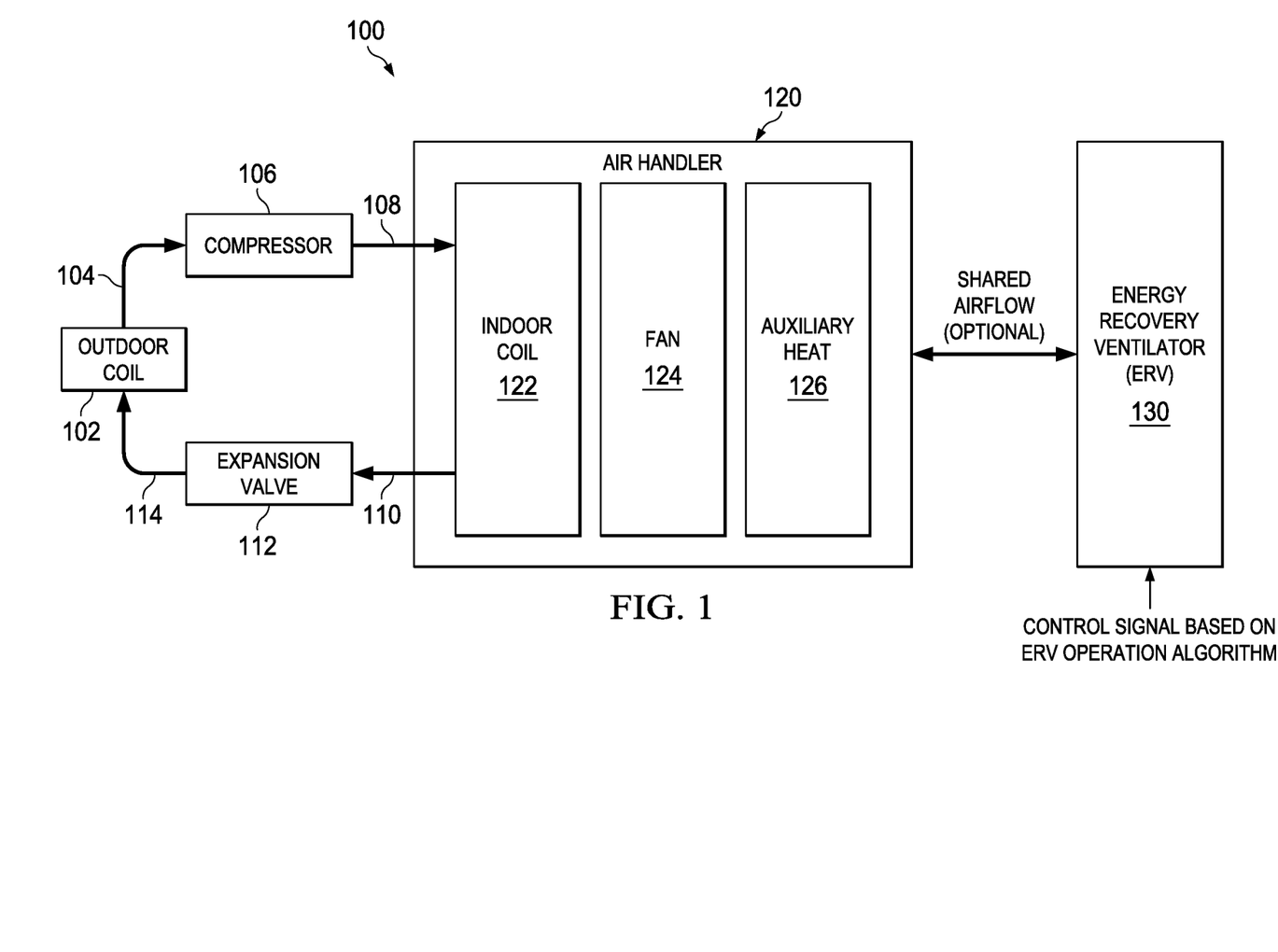
FIG. 1 illustrates an HVAC system with an energy recovery ventilator (ERV) in accordance with an embodiment of the disclosure.

FIG. 1 illustrates an HVAC system 100 with an energy recovery ventilator (ERV) 130 in accordance with an embodiment of the disclosure. In the HVAC system 100, refrigerant cycles through outdoor coil 102, compressor 106, indoor coil 122 and expansion valve 112. The arrows 104, 108, 110 and 114 show the direction of flow for refrigerant in a heating cycle. For a cooling cycle, the direction of flow for refrigerant in HVAC system 100 would be reversed.

In a heating cycle, the outdoor coil 102 causes refrigerant to evaporate. As the liquid refrigerant evaporates it pulls heat from the outside air. The gaseous refrigerant flows (arrow 104) from the outdoor coil 102 to compressor 106, where the gaseous refrigerant is compressed to produce a high-pressure, superheated refrigerant vapor. The vapor leaves compressor 106 and flows (arrow 108) to the indoor coil 122. At the indoor coil 122, air from fan (blower) 124 removes heat from the vapor (warming the indoor air) and, when enough heat is removed, the vapor condenses into a high-pressure liquid. This high-pressure liquid flows (arrow 110) from the indoor coil 122 to the expansion valve 112, which meters the flow (arrow 114) of the high-pressure liquid to the outdoor coil 102. The heating cycle process described herein can be repeated as needed. For example, the heating cycle of HVAC system 100 may be activated and/or maintained in response to a thermostat control signal.

As shown in FIG. 1, the indoor coil 122 and the fan 124 may be components of an air handler 120. The air handler 120 may also comprise an auxiliary furnace 126, which is activated as needed. Alternatively, the auxiliary furnace 126 may be separate from the air handler 120. In either case, the HVAC system 100 comprises the ERV 130, which is controlled in accordance with an ERV operation algorithm as described herein. The ERV operation algorithm determines when to operate the ERV 130. In some embodiments, the ERV operation algorithm accounts for ERV configurations where ERV operations should be synchronized with heat pump or auxiliary furnace operations. Such synchronization is needed, for example, when the airflow (ducting) for ERV operations is at least partly shared with the airflow for heat pump operations or auxiliary furnace operations. Although the ERV operations described herein may be synchronized with a heat pump as described herein, it should be understood that other ERV operations are possible. For example, an ERV may operate as a stand-alone device, or may operate with a heat pump (heating or cooling), a furnace, or other HVAC system components.

Figure 2:
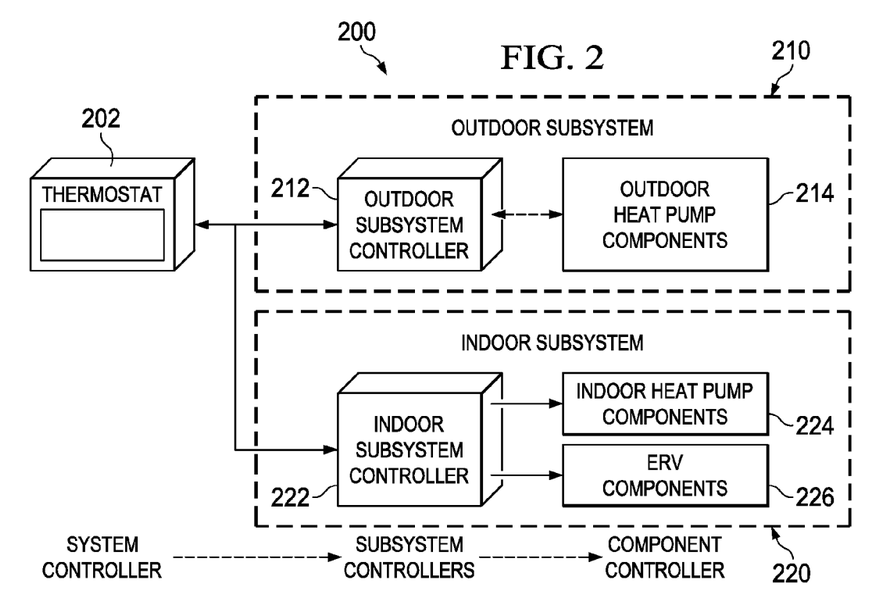
FIG. 2 illustrates a control system for the HVAC system of FIG. 1 in accordance with an embodiment of the disclosure.

FIG. 2 illustrates a control system configuration 200 for the HVAC system 100 of FIG. 1 in accordance with an embodiment of the disclosure. The control system configuration 200 illustrates a hierarchical control for HVAC systems, including those with an ERV as disclosed herein. As shown, the thermostat 202 operates as the overall system controller of configuration 200 and is configured to communicate with an indoor subsystem controller 222 of indoor subsystem 220 and an outdoor subsystem controller 212 of outdoor subsystem 210. The indoor subsystem 220 may comprise, for example, indoor heat pump components 224 (e.g., air handler 120) and ERV components 226 (e.g., ERV 130 of FIG. 1). Meanwhile, the outdoor subsystem 210 comprises outdoor heat pump components 214 such as the compressor 106 and the outdoor coil 102 described for FIG. 1. In at least some embodiments, the indoor subsystem controller 222 implements some or all of the ERV operation algorithm features described herein.

Figure 3:
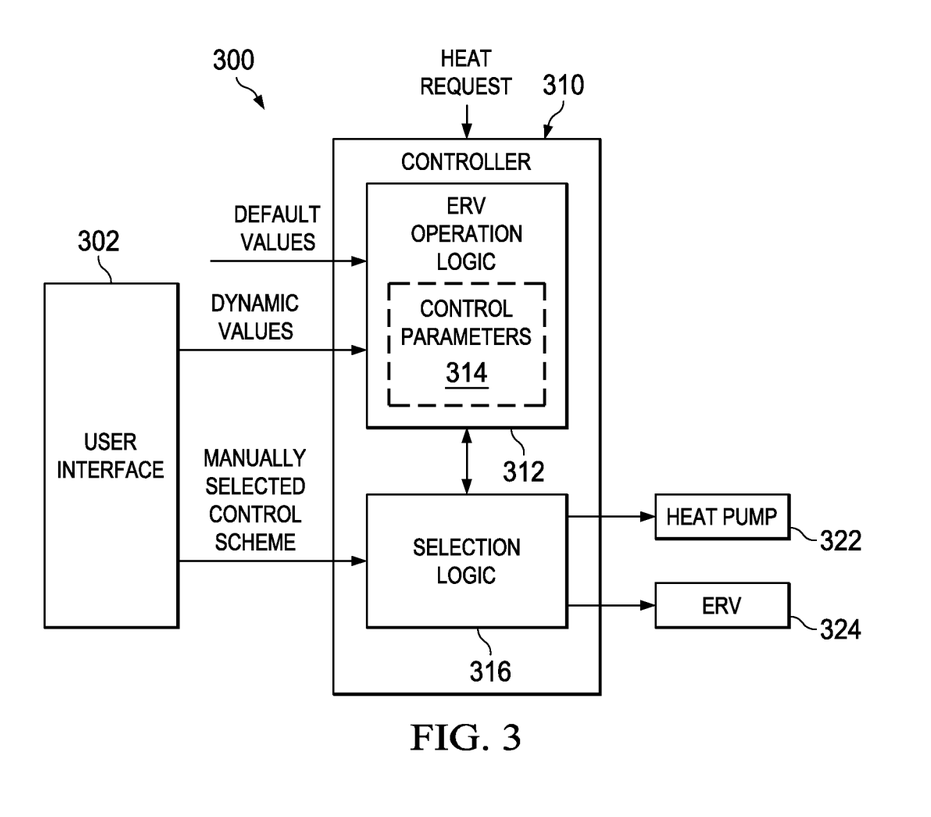
FIG. 3 illustrates a block diagram of a system in accordance with an embodiment of the disclosure.

FIG. 3 illustrates a block diagram of a system 300 in accordance with an embodiment of the disclosure. As shown, the system 300 comprises a controller 310 coupled to a heat pump 322 and an ERV 324. In at least some embodiments, the controller 310 and the user interface 302 corresponds to the indoor subsystem controller 222 of FIG. 2. In various embodiments, the user interface 302 corresponds to an interface on a thermostat or other control unit that enables user interaction to control operations of the heat pump 322 and the ERV 324. Alternatively, the user interface 302 may correspond to a computer program or web portal accessible via a handheld computing device (e.g., a smart phone), a laptop and/or a desktop computer.

In FIG. 3, the controller 310 comprises ERV operation logic 312 configured to select when to operate the ERV 324. The ERV operation logic 312 also may ensure that the ERV 324 operates at the same time as the heat pump 322 for configurations where the heat pump 322 and the ERV 324 share air ducts. To summarize, the ERV operation logic 312 comprises hardware (e.g., an ASIC, a microcontroller, a processor and/or a memory), or a combination of hardware and software, to perform the ERV operation algorithm described herein.

In accordance with at least some embodiments, the ERV operation logic 312 employs control parameters 314 to determine when to operate the ERV 324. Values for the control parameters 314 may be based on previously stored default values and/or based on dynamic values received via the user interface 302. As an example, the control parameters 314 may correspond to a square footage parameter of the indoor space environment associated with the ERV 324. The square footage parameter (or other parameters) may be received via the user interface, which provides appropriate query forms to a user.

In at least some embodiments, a CFM ventilation value is determined based on a default square footage parameter value or a square footage parameter value received from a user. Alternatively, a user may manually provide a CFM ventilation value via the user interface 302. In either case, the CFM ventilation value may then be compared with a total CFM capacity of the ERV 324. The ERV 324 may be operated based on the comparison. As a specific example, if the CFM ventilation value is 30% of the total CFM capacity of the ERV 324, the ERV operation logic 312 operates the ERV 324 at 30% of its total capacity. Assuming there is only one operational speed for ERV 324, operating the ERV at 30% of its total capacity refers to activating the ERV 324 for 30% of the total time possible. In some embodiments, the ERV 324 may simply receive a command from a user to operate at a percentage of its total capacity without determining the CFM ventilation value.

The control parameters 314 also may enable the ERV operation logic 312 to determine a load for automated operations of the ERV 324. In such embodiments, the control parameters 314 comprise a relative humidity parameter that is used to determine the load. The relative humidity parameter may be received via the user interface 302. The determined load information may be presented to the user (e.g., via user interface 302) and may include sensible load information and latent load information related to automated operations (determined by the ERV operation algorithm) of the ERV 324.

In FIG. 3, the selection logic 316 coupled to the ERV operation logic 312 may receive a recommendation or control signal from the ERV operation logic 312. In response to a control signal from the ERV operation logic 312, the selection logic 316 asserts a control signal to activate the ERV 324 and, if appropriate (e.g., when the heat pump 322 and the ERV 324 share airflow/duct paths), the heat pump 322. In accordance with at least some embodiments, the heat pump 322 and the ERV 324 are independently activated, but may be operated together.

The selection logic 316 is also configured to receive a manually selected control scheme for the ERV 324 from the user interface 302. The manually selected control scheme may correspond to adjusting or overriding a previously calculated percentage of the total capacity of the ERV 324. In other words, the user interface 302 enables a user to selectively disable and enable control of ERV operations based on the ERV operation logic 312. Additionally or alternatively, the user interface 302 enables a user to manually set a percentage of the total capacity at which the ERV 324 operates (or to otherwise control the amount of time that the ERV operates).

Figure 4A:
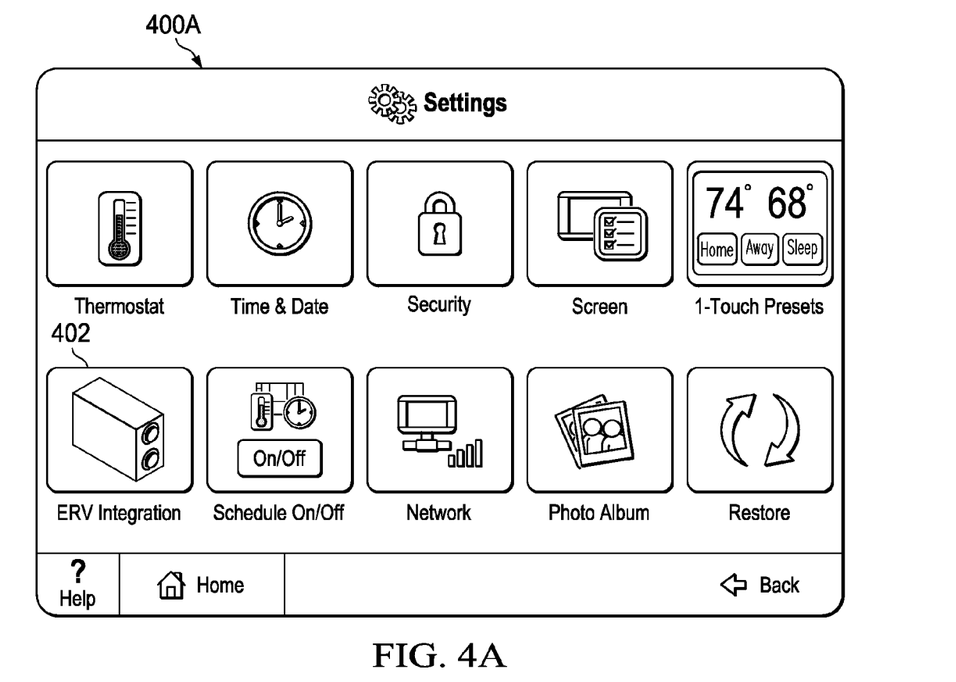
FIGS. 4A-4H shows windows of a user interface program for controlling ERV operations in accordance with an embodiment of the disclosure.

FIGS. 4A-4H show windows of a user interface program for controlling ERV operations in accordance with an embodiment of the disclosure. For example, the user interface program may be part of the user interface 302 described for FIG. 3. In FIG. 4A, window 400A shows a "settings" menu including an ERV integration icon 402 that can be selected by clicking on it. Selection of the ERV integration icon 402 enables a user to adjust control features for an ERV (e.g., the ERV 324 of FIG. 3). The other icons of FIG. 4A correspond to other control features or utilities accessible via the user interface program.

Figure 4B:
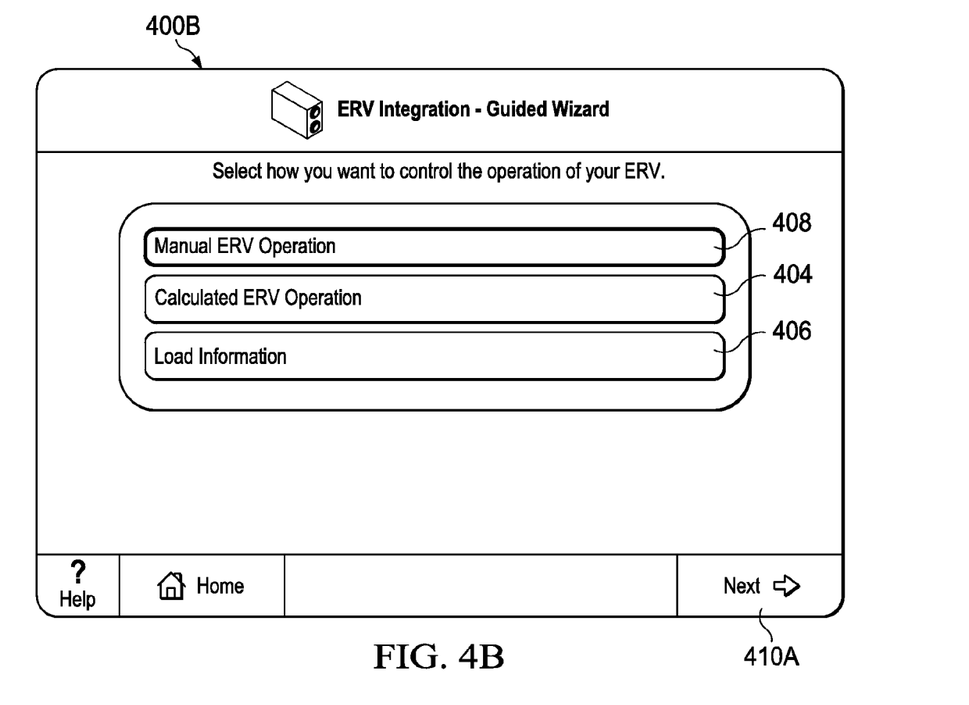

In FIG. 4B, window 400B shows an ERV integration menu that appears in response to clicking the ERV integration icon 402 of window 400A. The ERV integration menu of window 400B enables a user to manually adjust control features and/ or control parameter values for an ERV. For example, clicking on the "manual ERV operation" box 408 and then clicking the "next" button 410A enables a user to manually set when the ERV operates.

Figure 4C:
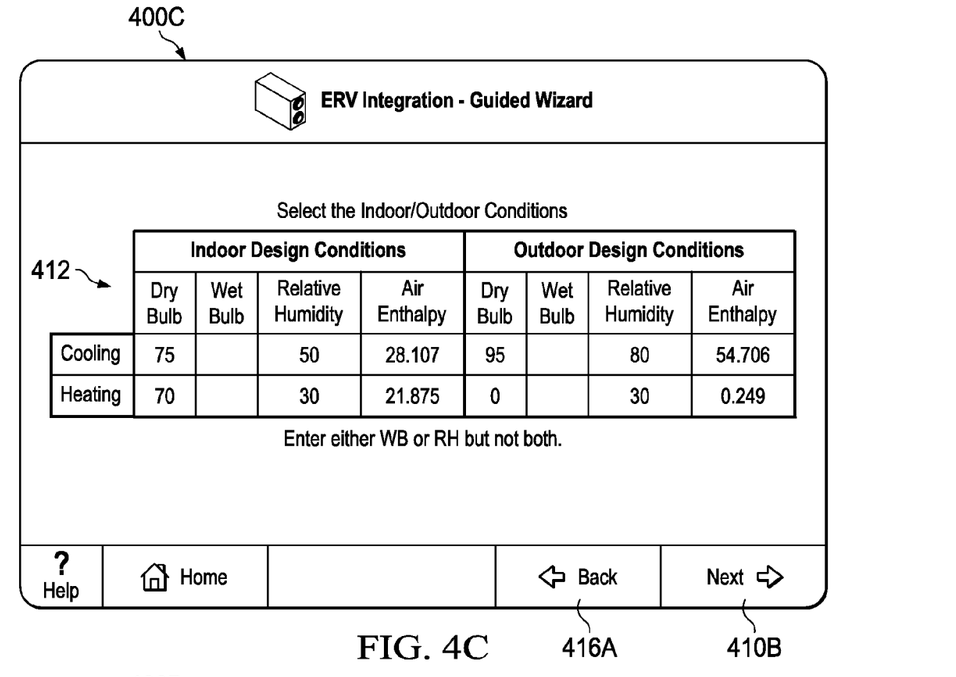
Figure 4D:
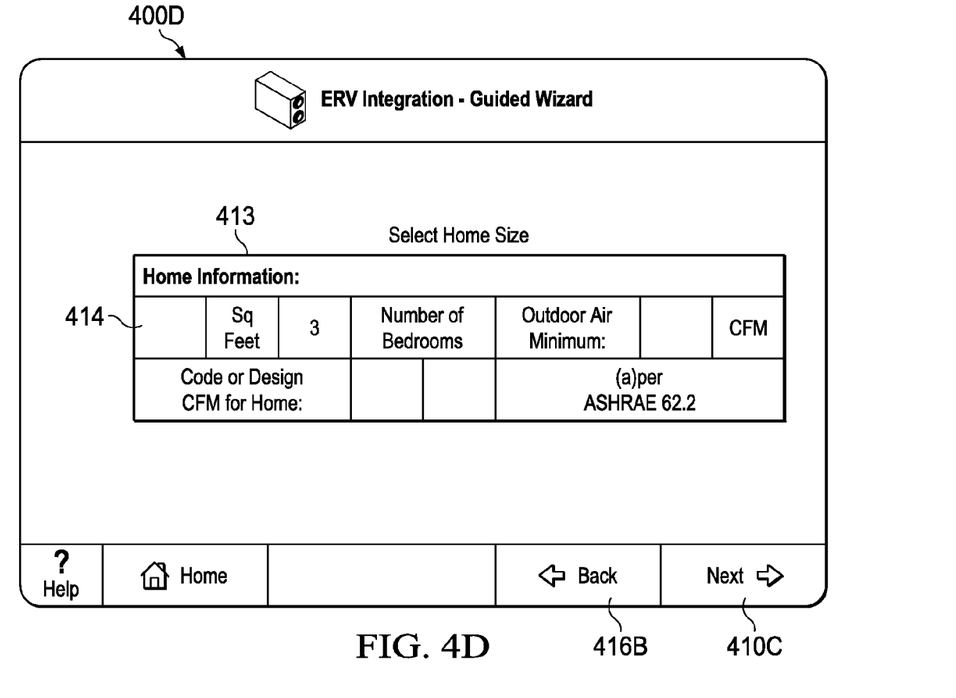
Figure 4E:
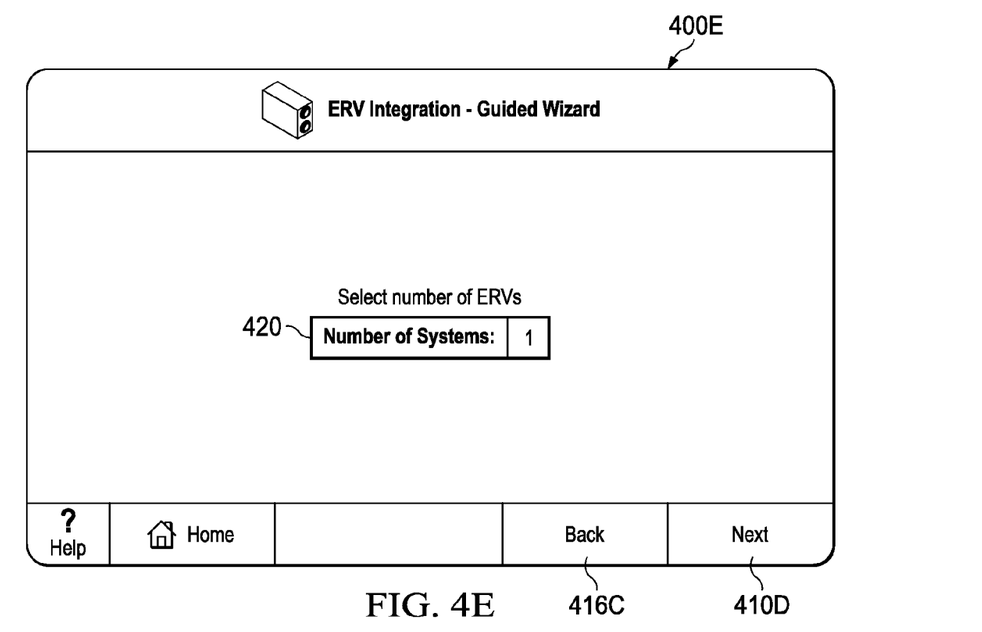
Figure 4F:
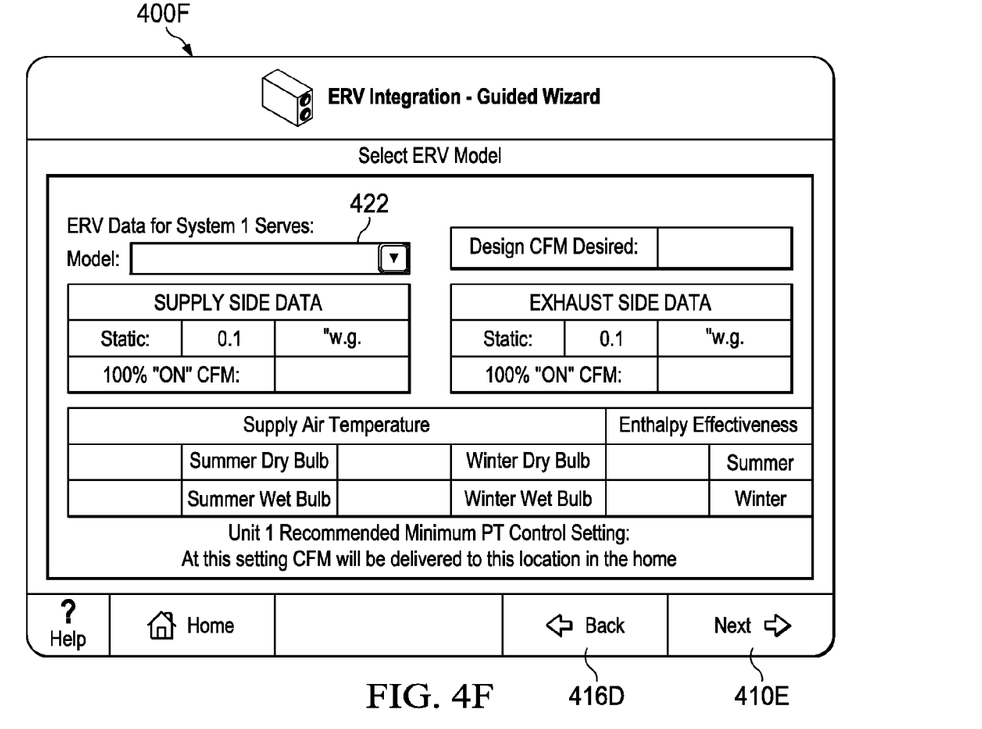
Figure 4G:
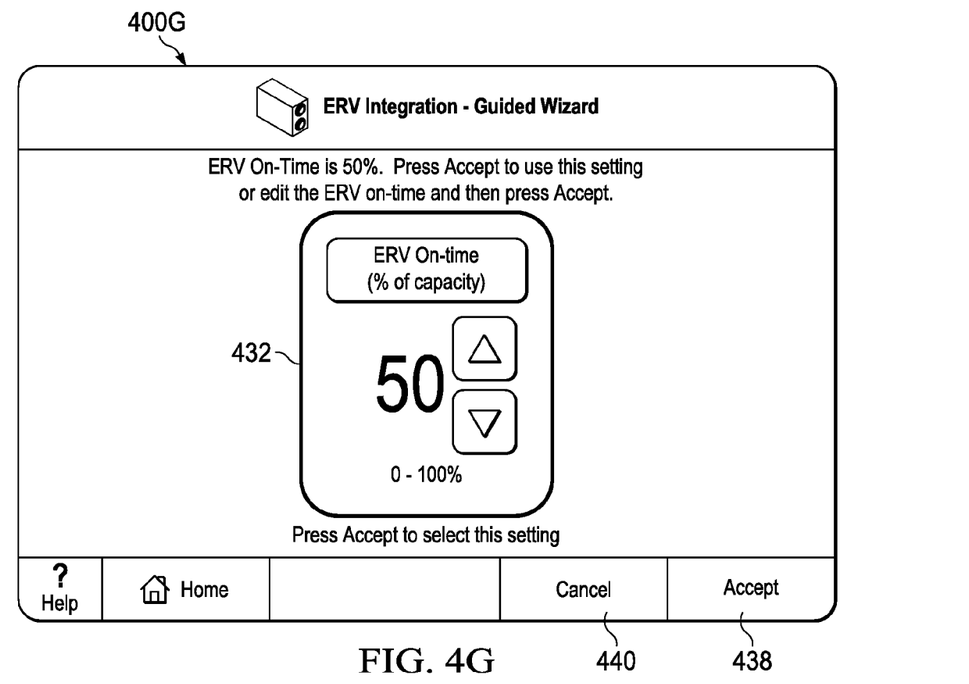

In FIG. 4G, a window 400G with an ERV "on-time" utility 432 is shown. The window 400G may be displayed, for example, after clicking on the manual ERV operation box 408 and the "next" box 410A in window 400B. The ERV on-time utility 432 enables a user to manually select an ERV on-time value for the ERV 324. The ERV on-time value displayed by the ERV on-time utility 432 may be initially set to a default value (e.g., 50%) and may be adjusted within a predetermined range (e.g., 0-100%). After selecting an ERV on-time value using the ERV on-time utility 432, a user is able to apply the selected ERV on-time value by clicking the "accept" button 438. In window 400G, selection of the "cancel" button 440 cancels any adjustments to the existing ERV on-time value and causes window 400B of FIG. 4B to be displayed again. Although only one ERV on-time utility 432 is shown in window 400G, it should be understood that when multiple ERVs are used, window 400G may show a separate ERV on-time utility 432 for each ERV.

Returning to window 400B, clicking on the "calculated ERV operation" box 404 and then clicking on the "next" button 410A enables a user to input values for control parameters (e.g., control parameters 314 of FIG. 3) of an ERV operation algorithm. In other words, selection of the calculated ERV operation box 404 causes implementation of the ERV operation algorithm for controlling the ERV 324. The various control parameter values for the ERV operation algorithm are input by a user via the user interface program as shown in windows 400D-400F of FIGS. 4D-4F. Although not shown, one or more default values may be provided in the user interface program for the control parameters used with the ERV operation algorithm. In addition to entering control parameters for the ERV operation algorithm in windows 400D-400F, a user also may enter relative humidity information in window 400C of FIG. 4C to determine load information for a manually selected ERV on-time setting or a calculated ERV on-time setting.

In FIG. 4C, window 400C includes an air enthalpy utility 412 that determines an air enthalpy value based on a dry bulb value and a relative humidity or, alternatively, based on a wet bulb value. More specifically, an air enthalpy value can be determined for various conditions including an indoor cooling condition, an indoor heating condition, an outdoor cooling condition, and an outdoor heating condition. For the indoor cooling condition, an indoor dry bulb value of 75 and an indoor relative humidity value of 50 results in an air enthalpy value of 28.107. For the indoor heating condition, an indoor dry bulb value of 70 and an indoor relative humidity value of 30 results in an air enthalpy value of 21.875. For the outdoor cooling condition, an outdoor dry bulb value of 95 and a relative humidity value of 80 results in an air enthalpy value of 54.706. For the outdoor heating condition, an outdoor dry bulb value of 0 and a relative humidity value of 30 results in an air enthalpy value of 0.249. Again, a wet bulb value could be used instead of dry bulb values and relative humidity values. In either case, the air enthalpy values determined by air enthalpy utility 412 can be utilized to determine load information for a manually selected ERV on-time setting or a calculated ERV on-time setting. To accept the air enthalpy values determined by air enthalpy utility 412, a user selects the "next" button 410B to return to window 400B. Alternatively, the user may return to window 400B without entering relative humidity value into the air enthalpy utility 412 (or without accepting air enthalpy values determined by air enthalpy utility 412) by clicking on the "back" button 416A.

Once a manually selected ERV on-time setting has been accepted or a calculated ERV on-time setting has been accepted, the air enthalpy values determined by air enthalpy utility 412 enable load information table 434 of window 400H (see FIG. 4H) to be populated with sensible load values for a "direct duct to return" ventilation load, for an ERV ventilation load, and for a load reduction due to ERV equipment. The load information table 434 is also populated with latent load values for the "direct duct to return" ventilation load, for the ERV ventilation load, and for load reduction due to ERV equipment. The load information table 434 is also populated with total load values (sensible load plus latent load) for the "direct duct to return" ventilation load, for the ERV ventilation load, and for load reduction due to ERV equipment. In at least some embodiments, the populated table 434 of window 400H can be viewed by clicking on the "load information" button 406 in window 400B and then clicking on the "next" button 410A.

Figure 4H:
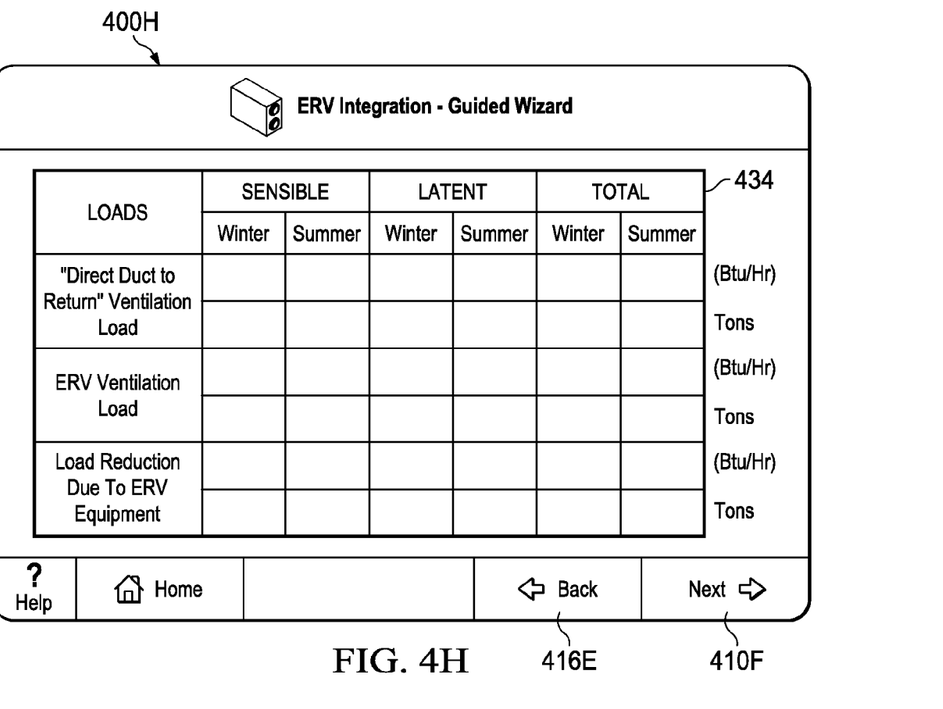

In the load information table 434 of window 400H, the "direct duct to return" ventilation load refers to a ventilation load where no ERV is used. Thus, the values for the load reduction due to ERV equipment refer to the difference between the load values when no ERV ventilation is used ("direct duct to return" ventilation is used) and the load values for the ERV ventilation load. In window 400H, clicking on the "back" button 416E may cause window 400C of FIG. 4C to be displayed, where the air enthalpy utility 412 may be accessed to update/adjust the air enthalpy values used to populate the load information table 434. Alternatively, clicking on the "next" button 410F of window 400H may cause window 400B to be displayed.

Returning to FIGS. 4D-4F, various windows 400D-400F enable selection of control parameter values for an ERV operation algorithm. The windows 400D-400F may be displayed in series, for example, after clicking on the calculated ERV operation box 404 and the "next" box 410A. In FIG. 4D, the window 400D includes a CFM utility 413 that determines a CFM ventilation value based on an indoor square footage value entered by a user in space 414. In at least some embodiments, the determined CFM ventilation value may be based on correlating the entered indoor square footage with predetermined CFM ventilation values in ASHRAE 62.2 or another source. To accept the determined CFM ventilation value, a user selects the "next" button 410C to proceed to window 400E. Alternatively, a user can return to window 400B by selecting the "back" button 416B.

In FIG. 4E, window 400E includes a "number of ERVs" selector 420 that enables a user to select how many ERVs are being used. To accept the selected number of ERVs indicated by selector 420, a user clicks the "next" button 410D. Alternatively, a user can return to window 400D by clicking the "back" button 416C.

For each ERV selected using selector 420, window 400F of FIG. 4F displays an ERV model selector 422 that enables a user to select one of a plurality of EVR models. The selection of an ERV model using ERV model selector 422 populates the various data fields of window 400F with corresponding CFM capacity information and/or enthalpy effectiveness information. In at least some embodiments, clicking on the "back" button 416D in window 400F causes window 400E of FIG. 4E to be displayed. Meanwhile, clicking on the "next" button 410E in window 400F causes another window 400F to be displayed if additional numbers of ERVs were selected by selector 420. If there are no more ERVs to select, clicking on the "next" button 410E causes window 400G to be displayed, where an ERV on-time utility 432 is displayed for each ERV. The ERV on-time value shown for each ERV on-time utility 432 would be set in accordance with the control parameter values entered in windows 400D-400F. Each ERV on-time utility 432 also enables a user to adjust the determined ERV on-time value up or down. With or without adjustment, a user is able to accept the ERV on-time value for each ERV on-time utility 432 by selecting the "accept" button 438. In window 400G, selection of the "cancel" button 440 cancels any adjustments to the existing ERV on-time value and causes window 400B of FIG. 4B to be displayed again.

Although windows 400C-400H describe various features and utilities in a particular order, the windows presented herein are not intended to limit other user interface embodiments that may implement ERV control features as described herein. In other words, user interface embodiments may vary with regard to how ERV control information is presented to a user and how a user enters ERV control parameters.

Figure 5:
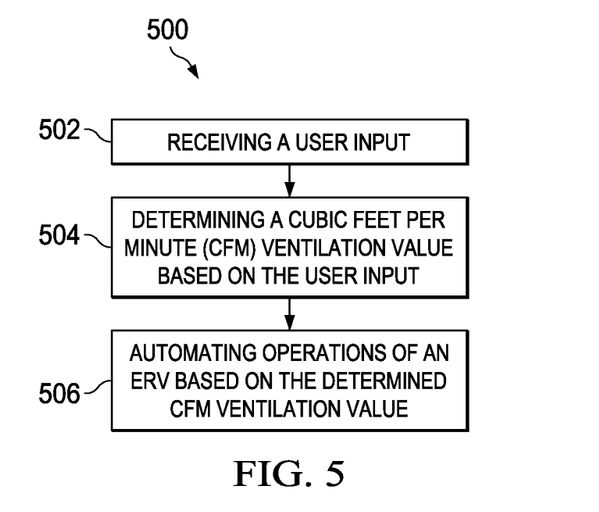
FIG. 5 shows a method in accordance with an embodiment of the disclosure.

FIG. 5 shows a method 500 in accordance with an embodiment of the disclosure. The method 500 may be performed by a controller (e.g., controller 310) or control system for an HVAC system with one or more ERVs as described herein. As shown, the method 500 comprises receiving a user input (block 502). At block 504, a CFM ventilation value is determined based on the user input. Finally, the method 500 comprises automating operations of an ERV based on the determined CFM ventilation value (block 506). For example, automating operations of the ERV based on the determined CFM ventilation value may involve comparing the determined CFM ventilation value with a total CFM capacity of the ERV and automating operations of the ERV based on the comparison.

In at least some embodiments, the method 500 may additionally comprise selectively synchronizing automated operations of the ERV with operations of a heat pump. For example, this may be done if the ERV and heat pump share at least some air ducts. Additionally, the method 500 may comprise estimating load information for automated operations of the ERV based on relative humidity information received from a user.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system, comprising:
   a heat pump;
   an energy recovery ventilator (ERV); and
   a controller coupled to the heat pump and the ERV, wherein the controller selectively implements an ERV operation algorithm that automates a ventilating operation of the ERV, wherein the ERV operation algorithm determines a cubic feet per minute (CFM) ventilation value based on a square footage value, compares the CFM ventilation value with a total CFM capacity of the ERV, and automates the ventilating operation of the ERV based on the comparison;
   wherein the controller comprises a user interface that selectively provides an input prompt for selection between (1) operating the controller to control the ERV according to the ERV operation algorithm and (2) operating the controller to operate the ERV according to a user selectable percentage of a total capacity of the ERV without respect to the CFM ventilation value;
   wherein the user interface comprises an air enthalpy utility that determines an air enthalpy value as a result of selectively entering at least one of (1) a relative humidity value and a dry bulb temperature and (2) a wet bulb temperature; and
   wherein the ERV operation algorithm utilizes the air enthalpy value to determine a direct duct to return ventilation load and an ERV ventilation load to operate the ERV for at least one of (1) a calculated ERV on-time setting and (2) a manually selected ERV on-time setting.

2. The system of claim 1 wherein the controller directs operations of the ERV and the heat pump independently.

3. The system of claim 1 wherein the controller directs the heat pump to operate at the same time as the ERV.

4. The system of claim 1 wherein the CFM ventilation value is determined based on input received via the user interface.

5. The system of claim 4 wherein the user interface provides a square footage query form and wherein the CFM ventilation value is determined based on square footage information received via the square footage query form.

6. The system of claim 1 wherein the user interface displays sensible load information and latent load information related to the automated ventilating operation of the ERV using the ERV operation algorithm.

7. A control system for an energy recovery ventilator (ERV), the control system comprising:
   a user interface; and
   ERV operation logic coupled to the user interface, wherein the ERV operation logic is configured to automate a ventilating operation of the ERV based on user inputs via the user interface;
   wherein the ERV operation logic determines a cubic feet per minute (CFM) ventilation value based on user input via the user interface, compares the CFM ventilation value with a total CFM capacity of the ERV, and selectively automates the ventilating operation of the ERV based on the comparison;

wherein the controller comprises a user interface that selectively provides an input prompt for selection between (1) controlling the ERV according to the ERV operation logic and (2) controlling the ERV according to a user selectable percentage of a total capacity of the ERV without respect to the CFM ventilation value;

wherein the user interface comprises an air enthalpy utility that determines an air enthalpy value as a result of selectively entering at least one of (1) a relative humidity value and a dry bulb temperature and (2) a wet bulb temperature; and wherein the ERV operation logic utilizes the air enthalpy value to determine a direct duct to return ventilation load and an ERV ventilation load to operate the ERV for at least one of (1) a calculated ERV on-time setting and (2) a manually selected ERV on-time setting.

8. The control system of claim 7 wherein the ERV operation logic selectively synchronizes the ventilating operation of the ERV with operation of a heat pump.

9. The control system of claim 7 wherein the ERV operation logic automates the ventilating operation of the ERV based on square footage information received via the user interface.

10. A method for controlling an energy recovery ventilator (ERV), comprising:

receiving, by a controller, a user input;

determining, by the controller, a cubic feet per minute (CFM) ventilation value based on the user input;

comparing the CFM ventilation value with a total CFM capacity of the ERV; and selectively automating, by the controller, a ventilating operation of the ERV based on comparing the CFM ventilation value with the total CFM capacity of the ERV;

wherein the controller comprises a user interface that selectively provides an input prompt for selection between () operating the controller to control the ERV as a function of the determined CFM ventilation value and (2) operating the controller to control the ERV according to a user selectable percentage of a total capacity of the ERV without respect to the determined CFM ventilation value;

wherein the user interface comprises an air enthalpy utility that determines an air enthalpy value as a result of selectively entering at least one of (1) a relative humidity value and a dry bulb temperature and (2) a wet bulb temperature; and wherein an ERV operation algorithm utilizes the air enthalpy value to determine a direct duct to return ventilation load and an ERV ventilation load to operate the ERV for at least one of (1) a calculated ERV on-time setting and (2) a manually selected ERV on-time setting.

11. The method of claim 10 further comprising selectively synchronizing the automated ventilating operation of the ERV with operation of a heat pump.

* * * * *